US012687463B2

(12) United States Patent
Sperrfechter et al.

(10) Patent No.: US 12,687,463 B2
(45) Date of Patent: Jul. 21, 2026

(54) SENSOR AND HOUSING ARRANGEMENT FOR GAS ANALYSIS

(71) Applicant: Siemens Aktiengesellschaft, Munich (DE)

(72) Inventors: Frank Sperrfechter, Ötigheim (DE); Simon Weida, Göcklingen (DE); Mathias Baader, Rastatt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 230 days.

(21) Appl. No.: 18/496,058

(22) Filed: Oct. 27, 2023

(65) Prior Publication Data

US 2024/0142343 A1     May 2, 2024

(30) Foreign Application Priority Data

Oct. 28, 2022    (EP) ..................................... 22204507

(51) Int. Cl.
    *G01M 15/10*        (2006.01)
    *G01M 15/02*        (2006.01)
(52) U.S. Cl.
    CPC .......... *G01M 15/102* (2013.01); *G01M 15/02* (2013.01)
(58) Field of Classification Search
    CPC ... G01M 15/02; G01M 15/102; G01M 15/104
    See application file for complete search history.

(56) References Cited

U.S. PATENT DOCUMENTS

| | | | |
|---|---|---|---|
| 6,015,533 A | 1/2000 | Young | 422/83 |
| 6,672,132 B1 * | 1/2004 | Weyl | G01N 27/407 73/23.31 |
| 2005/0247560 A1 * | 11/2005 | Weyl | G01N 27/4062 204/431 |
| 2007/0251823 A1 * | 11/2007 | Yamada | G01N 27/4077 204/424 |
| 2010/0050738 A1 | 3/2010 | Gustin | 73/23.31 |
| 2015/0192509 A1 | 7/2015 | Brueck | G01N 15/06 |
| 2017/0363597 A1 | 12/2017 | Adachi et al. | |
| 2018/0321125 A1 * | 11/2018 | Holzknecht | G01N 27/4077 |
| 2019/0195767 A1 * | 6/2019 | Kim | F02D 41/1466 |

(Continued)

FOREIGN PATENT DOCUMENTS

| | | | |
|---|---|---|---|
| CN | 2 685 875 | 3/2005 | ........... G01N 27/409 |
| DE | 102010046851 A1 * | 3/2012 | ........... G01N 1/2252 |
| WO | 2022 064271 | 3/2022 | ........... G01N 27/407 |

*Primary Examiner* — Eric S. McCall
(74) *Attorney, Agent, or Firm* — Slayden Grubert Beard PLLC

(57)        ABSTRACT

Various embodiments of the teachings herein include an arrangement comprising: a sensor unit; a housing with a first end, a second end, a plurality of inlet openings, and an outlet opening; and an attachment apparatus for a fixed mechanical attachment of the housing to a wall at the first end of the housing. The outlet opening is not one of the plurality of inlet openings. The sensor unit is arranged at least partially inside the housing at a first distance from the first end and at a second distance from the second end. The first distance is greater than the second distance. The outlet opening is at a third distance from the first end and a fourth distance from the second end. The third distance is greater than the fourth distance.

14 Claims, 3 Drawing Sheets

(56) References Cited

U.S. PATENT DOCUMENTS

2023/0273154 A1* 8/2023 Komaru ................. G01N 27/64
                                                    250/281
2024/0328919 A1* 10/2024 Takayanagi .......... G01N 15/075

* cited by examiner

SENSOR AND HOUSING ARRANGEMENT FOR GAS ANALYSIS

CROSS-REFERENCE TO RELATED APPLICATIONS

This application claims priority to EP Application No. 22204507.2 filed Oct. 28, 2022, the contents of which are hereby incorporated by reference in their entirety.

TECHNICAL FIELD

The present disclosure relates to gas analysis. Various embodiments of the teachings herein include arrangements and/or analysis devices for determining gas concentrations.

BACKGROUND

Industrial processes use energy conversion by combustion in order to generate steam and/or heat for an industrial process. To this end a flame of a heat generator burns during operation in a combustion apparatus. The heat generator changes the heat energy of the hot combustion gases into another fluid such as for example water. With the warm water for example a hot water heating system is operated and/or drinking water is heated up. In accordance with another form of embodiment a good can be heated up, in an industrial process for example, with the heat energy of the hot fuel and/or combustion gases. The heat generator may be part of a system with power-heat coupling, for example a motor of such a system. The heat generator may be a gas turbine. The heat generator can further serve to heat water in a system for obtaining lithium and/or lithium carbonate. The exhaust gases are vented from the combustion chamber for example via an exhaust gas stack and/or a flue gas stack and/or a chimney.

A few such processes include the operation of an oven or boiler. While the combustion represents a low-cost conversion of energy, attempts are frequently made to maximize the combustion efficiency within a process. Inter alia, the maximization of the combustion efficiency is a consequence of the resulting exhaust gases and/or flue gases that leave the system. Those exhaust gases and/or flue gases are sometimes the subject of regulations regarding the emissions of harmful gases. Thus one objective of the optimization is to maximize the combustion efficiency of existing ovens and/or boilers. Accompanying this is a reduction in the production of greenhouse gases and other harmful byproducts.

A further objective is the optimization for different fuels and/or combustion gases. In particular this involves fuels and/or combustion gases that comprise hydrogen gases. In some cases, it involves fuels and/or combustion gases, which at 293 degrees Kelvin comprise more than twenty percent by volume of hydrogen. In a few cases, at 293 degrees Kelvin, the proportion of hydrogen gas is at fifty percent by volume or even at seventy percent by volume.

The combustion efficiency can be optimized by regulating the oxygen content in the exhaust gases and/or flue gases originating from the combustion process. In this way the oxidation of the combustion byproducts is largely ensured.

In-situ or in-process analysis devices can be employed during monitoring and/or optimizing and/or control of an ongoing combustion process. Current analysis devices comprise a sensor unit. The sensor unit is heated up to high temperatures. It operates directly in the combustion zone or near the combustion zone of the oven or boiler.

Known analysis devices typically use an oxygen sensor based on zirconium dioxide. The oxygen sensor is arranged at the end of a probe, which is introduced into a flue gas stream. When the exhaust gas and/or flue gas flows into the analysis device, it diffuses through a filter or diffusor in the vicinity of the zirconium dioxide-based oxygen sensor. There are no pumps and/or other flow-inducing apparatuses that are used to direct the probe flow into the analysis device. Instead the gas passes passively through the diffusor. The sensor delivers an electrical signal, which specifies an amount of oxygen present in the exhaust gas and/or flue gas.

The oxygen sensor based on zirconium dioxide offers a potentiometric indication. The potentiometric indication counts as a reliable oxygen measurement in combustion environments. It makes possible an efficient and/or safe process control. Typically an individual probe is introduced into the process for example into the exhaust gas stack and/or in the flue gas stack and/or into the chimney. A percentage oxygen measurement is used to optimize the combustion efficiency in small boilers and/or ovens. In large systems the operator frequently decides on an exhaust gas stratification and/or flue gas stratification. The exhaust gas stratification and/or flue gas stratification comprises a plurality of layers each with a different oxygen concentration.

In order to obtain stratification information, for an efficient and safe operation, operators can install a number of probes into the exhaust gas stack and/or into the flue gas stack and/or into the chimney. In individual cases up to sixteen such probes can be installed.

A typical in-situ or in-process analysis device with a potentiometric sensor based on zirconium dioxide provides a single-point oxygen measurement. Such analysis devices are used for optimization of the combustion efficiency in power stations and/or combustion systems and/or refineries and/or chemical plants and/or small combustion plants. As described above, large exhaust gas stacks have a significant exhaust gas stratification with a plurality of different concentration layers in the exhaust gas. Large exhaust gas stacks further have a significant exhaust gas stratification with a plurality of different concentration layers in the flue gas. Above and beyond this large chimneys have a significant exhaust gas stratification with a plurality of different concentration layers in the exhaust gas and/or flue gas.

In such cases it is usual to use a number of probes in such large combustion applications. However the use of such probes increases the complexity and susceptibility to errors of the overall combustion automation system. For example each analysis device requires power and/or signal cables, calibration gas pipes and a holder.

An alternative for a few large combustion applications for provision of stratification information is the use of an oxygen sensor based on a tunable diode laser. Such sensors are used in applications in order to provide average oxygen concentrations. Such systems do not have the advantage of a regular in-situ calibration. Such tunable diode lasers are further based on optical radiation, which passes through the exhaust gas and/or flue gas. Tunable diode lasers are then subject to limitations when the exhaust gas and/or flue gas is partly or completely opaque.

A published utility model CN2685875Y deals with an integral smoke analysis device based on zirconium dioxide. The document CN2685875Y discloses an analysis device with a measuring tip. Attached to a first end of the measuring tip are a sensor based on zirconium dioxide, a heater and a temperature sensor. Located at a second end of the measuring tip are two gas connections and also a housing. Projecting from the housing is an outlet.

An international patent application WO2022/064271A1 deals with an in-situ analysis device with averaging. WO2022/064271A1 discloses an analysis device with a measuring tip. The measuring tip has a first and a second end. Located between the first and the second end of the measuring tip are a number of openings. Located close to the second end of the measuring tip are a sensor unit and a flange for attaching the analysis device. Thus gas flows through each opening of the plurality of openings in the direction of the sensor unit. The plurality of openings allows an averaging of gas concentrations.

A patent application DE102012211039A1 deals with a gas sensor for soot.

U.S. Pat. No. 6,015,533A deals with a sensor housing for a calorimetric sensor. The application date of U.S. Pat. No. 6,015,533A is Nov. 14, 1997.

A patent application US2010/050738A1 deals with a sensor arrangement with a thermally insulating housing.

SUMMARY

The teachings of the present disclosure provide an arrangement that makes possible an analysis of gas at a combustion apparatus. Different concentrations of such gases are to be averaged so as to obtain an informative result. In particular the result should make possible an open-loop and/or closed-loop control of the combustion apparatus. For example, some embodiments of the teachings herein include an arrangement comprising a sensor unit (8) and a housing (1) with a first (1a) and a second end (1b), with a plurality of inlet openings (4a-4f) and with at least one outlet opening (6a-6c); wherein the arrangement comprises an attachment apparatus (3) for mechanical attachment of the housing (1) to a wall (2) at the first end (1a) of the housing (1), so that the housing (1) is essentially immovable in relation to the wall (2); wherein the first end (1a) is different from the second end (1b) and the at least one outlet opening (6a-6c) is different from each inlet opening of the plurality of inlet openings (4a-4f); wherein the sensor unit (8) is arranged in the inside of the housing (1) and is at a first distance from the first end (1a) and at a second distance from the second end; wherein the first distance between the sensor unit (8) and the first end (1a) is greater than the second distance between the sensor unit (8) and the second end (1b); wherein the at least one outlet opening (6a-6c) is at a first distance from the first end (1a) and at a second distance from the second end (1b); and wherein the first distance between the at least one outlet opening (6a-6c) and the first end (1a) is greater than the second distance between the at least one outlet opening (6a-6c) and the second end (1b).

In some embodiments, the attachment apparatus (3) is at a first distance from the first end (1a) and at a second distance from the second end; and the first distance between the attachment apparatus (3) and the first end (1a) is less than the second distance between the attachment apparatus (3) and the second end (1b).

In some embodiments, the attachment apparatus (3) comprises a flange.

In some embodiments, the arrangement comprises a pair of electrical leads; and at least one electrical lead of the pair of electrical leads (9a, 9b) extends from the sensor unit (8) to the attachment apparatus (3).

In some embodiments, at least one electrical lead of the pair of electrical leads (9a, 9b) mechanically supports the sensor unit (8) in relation to the housing (1).

In some embodiments, the arrangement comprises an evaluation unit; and at least one electrical lead of the pair of electrical leads (9a, 9b) connects the sensor unit (8) electrically to the evaluation unit.

In some embodiments, the arrangement comprises precisely one outlet opening (6a-6c).

In some embodiments, the housing (1) comprises a first side, which extends from the first end (1a) of the housing (1) to the second end (1b) of the housing (1); the housing (1) comprises a second side, which extends from the first end (1a) of the housing (1) to the second end (1b) of the housing (1); the second side is different from the first side; at least one inlet opening of the plurality of inlet openings (4a-4f) is arranged on the first side; and the at least one outlet opening (6a) is arranged on the second side.

In some embodiments, each inlet opening of the plurality of inlet openings (4a-4f) is arranged on the first side.

In some embodiments, the at least one outlet opening (6b) is arranged directly at the second end (1b).

In some embodiments, the housing (1) comprises a first side, which extends from the first end (1a) of the housing (1) to the second end (1b) of the housing (1); the housing (1) comprises a second side, which extends from the first end (1a) of the housing (1) to the second end (1b) of the housing (1); the second side is different from the first side; at least one inlet opening of the plurality of inlet openings (4a-4f) is arranged on the first side; and the at least one outlet opening (6b) is arranged outside the first side and outside the second side.

In some embodiments, the housing (1) comprises a tubular section at its second end (1b); and the at least one outlet opening (6b) comprises an open end of the tubular section.

In some embodiments, the housing (1) comprises a slanted section at its second end (1b); and the at least one outlet opening (6c) is part of the slanted section.

In some embodiments, the housing (1) comprises a first side, which extends from the first end (1a) of the housing (1) to the second end (1b) of the housing (1); at least one inlet opening of the plurality of inlet openings (4a-4f) is arranged on the first side; the housing (1) comprises a slanted section, which runs at an angle to the first side, at its second end (1b); and the at least one outlet opening (6c) is part of the slanted section.

As another example, some embodiments include a combustion apparatus comprising a combustion chamber and an exhaust gas stack and/or flue gas stack and/or chimney, wherein the exhaust gas stack and/or flue gas stack and/or chimney is in fluid communication with the combustion chamber; the exhaust gas stack and/or flue gas stack and/or chimney comprises a wall (2); and the attachment apparatus (3) of an arrangement described herein is mechanically mounted to the wall (2).

BRIEF DESCRIPTION OF THE DRAWINGS

Various features will be evident to the person skilled in the art from the more detailed description given below of the disclosed non-restrictive embodiments of the teachings herein. The drawings that are disclosed with the more detailed description can be described as follows.

DETAILED DESCRIPTION

Figure 1:
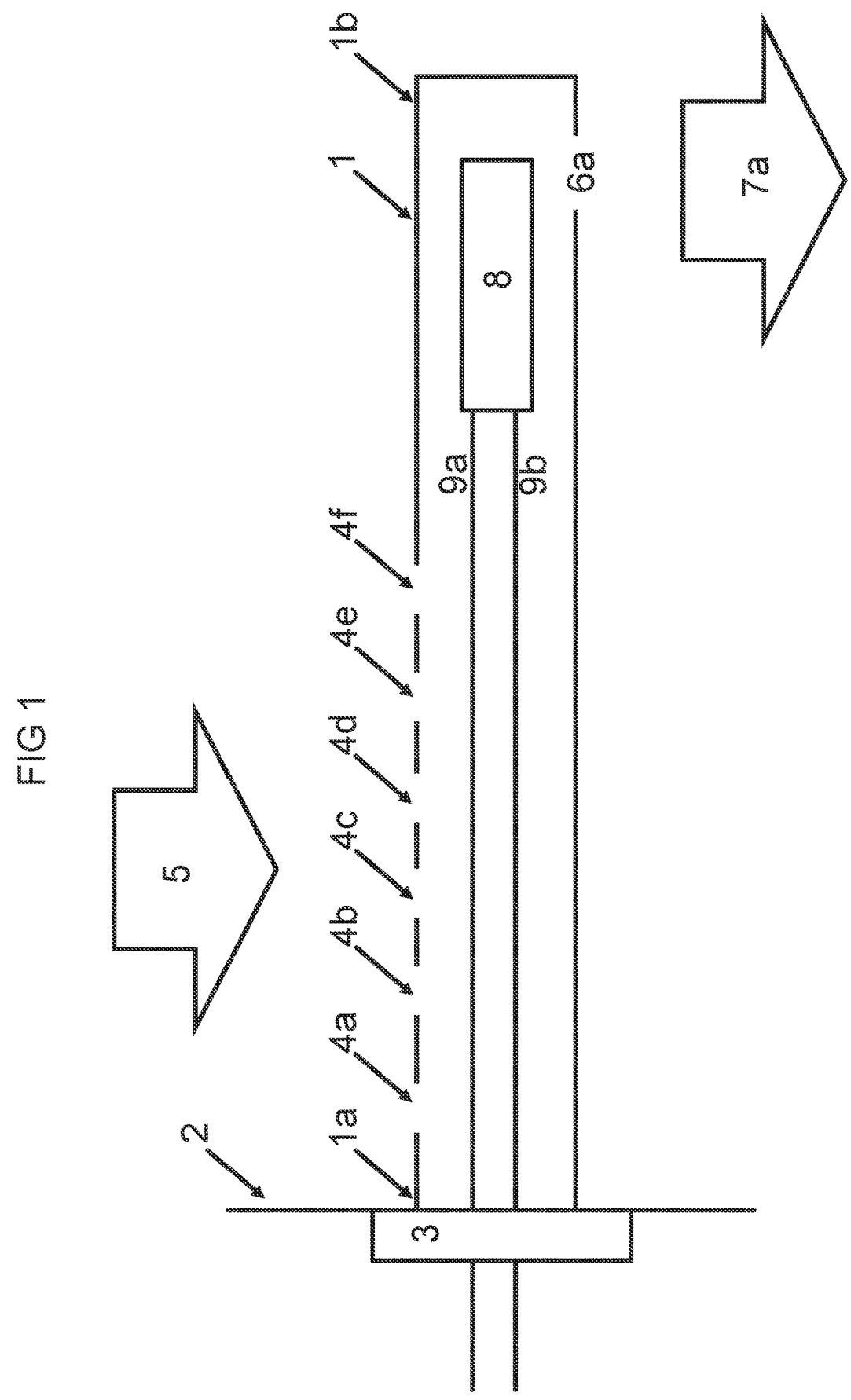
FIG. 1 shows a schematic of an arrangement and/or an analysis device for determination by averaging of a gas concentration in a combustion apparatus.

Various embodiments of the teachings herein include an arrangement and/or an analysis device with in-situ and/or in-process averaging. The arrangement and/or the analysis device comprises a housing and a sensor unit. The sensor unit is fastened to the housing.

In some embodiments, the housing can in particular be embodied as a measuring tip. The housing comprises a first and a second end. The first end of the housing is different from the second end of the housing. The first end of the housing is arranged opposite the second end of the housing. In particular the measuring tip can comprise a first and a second end. The first end of the measuring tip is different from the second end of the measuring tip. The first end of the measuring tip is arranged opposite the second end of the measuring tip.

In some embodiments, the first End of the housing is arranged with the aid of a flange on a side wall of an exhaust gas stack and/or flue gas stack and/or chimney. In some embodiments, the second end of the housing to project into the exhaust gas stack and/or into the flue gas stack and/or into the chimney. In particular the first end of the measuring tip can for example be arranged with the aid of a flange on a side wall of the exhaust gas stack and/or flue gas stack and/or chimney. The second end of the measuring tip can further project into the exhaust gas stack and/or into the flue gas stack and/or into the chimney.

The sensor unit is arranged in the housing. The sensor unit is arranged close to the second end of the housing. This means that the sensor unit is arranged closer to the second end of the housing than to the first end of the housing. In other words a first distance between the sensor unit and the first end of the housing is greater than a second distance between the sensor unit and the second end of the housing.

In some embodiments, the sensor unit can be arranged and attached in the measuring tip. The sensor unit is arranged close to the second end of the measuring tip. This means that the sensor unit is arranged closer to the second end of the measuring tip than to the first end of the measuring tip. In other words a first distance between the sensor unit and the first end of the measuring tip is greater than a second distance between the sensor unit and the second end of the measuring tip.

Arranged between the first end of the housing and the second end of the housing are a plurality of inlet openings. The distances between the individual inlet openings of the housing can be different in this case. Likewise the inlet openings of the housing can have different opening cross-sections.

In some embodiments, a plurality of inlet openings can be arranged between the first end of the measuring tip and the second end of the measuring tip. The distances between the individual inlet openings of the measuring tip can be different in this case. Likewise the inlet openings of the measuring tip can have different opening cross-sections.

Arranged close to the second end of the housing or at the second end of the housing is an outlet opening. This means that the outlet opening lies closer to the second end of the housing than to the first end of the housing. In other words a first distance between the outlet opening and the first end of the housing is greater than a second distance between the outlet opening and the second end of the housing.

In some embodiments, the outlet opening of the housing is an outlet opening for exhaust gases and/or flue gases. The outlet opening of the housing is different from each inlet of the plurality of inlet openings of the housing. In some embodiments, the housing comprises precisely one outlet opening for exhaust gases and/or flue gases.

In some embodiments, the inlet openings are arranged on a first side of the housing. The outlet opening is arranged on a second side of the housing, wherein the second side lies opposite the first side. The first side of the housing is different from the first end and from the second end of the housing. The second side of the housing is different from the first end and from the second end of the housing.

In some embodiments, the outlet opening of the housing is arranged on the second end of the housing. This outlet opening can for example comprise or can be a hole drilled through the second end of the housing.

In some embodiments, the second end of the housing comprises a slanting section. The slanting section of the housing comprises the outlet opening. The outlet opening of the slanting end of the housing can for example comprise or be a hole drilled through the slanting section of the housing.

An outlet opening can be arranged close to the second end of the measuring tip or at the second end of the measuring tip. This means that the outlet opening lies closer to the second end of the measuring tip than to the first end of the measuring tip. In other words a first distance between the outlet opening and the first end of the measuring tip is greater than a second distance between the outlet opening and the second end of the measuring tip.

In some embodiments, the outlet opening of the measuring tip is an outlet opening for exhaust gases and/or flue gases. The outlet opening of the measuring tip is different from each inlet of the plurality of inlet openings of the measuring tip. In some embodiments, the measuring tip comprises precisely one outlet opening for exhaust gases and/or flue gases.

In some embodiments, the inlet openings are arranged on a first side of the measuring tip. The outlet opening is arranged on a second side of the measuring tip, wherein the second side lies opposite the first side. The first side of the measuring tip is different from the first end and from the second end of the measuring tip. The second side of the measuring tip is different from the first end and from second end of the measuring tip.

In some embodiments, the outlet opening of the measuring tip is arranged at the second end of the measuring tip. This outlet opening can for example comprise or be a hole drilled through the second end of the measuring tip.

In some embodiments, the second end of the measuring tip comprises a slanting section. The slanting section of the measuring tip comprises the outlet opening. The outlet opening of the slanting end of the measuring tip can for example comprise or be a hole drilled through the slanting end of the measuring tip.

Illustrated in FIG. 1 is an arrangement and/or an analysis device incorporating teachings of the present disclosure. The arrangement and/or the analysis device comprises a housing 1. The housing 1 comprises a first end 1*a* and a second end 1*b*. The first end 1*a* of the housing 1 is different from the second end 1*b* of the housing 1. In some embodiments, the first end 1*a* lies opposite the second end 1*b* of the housing 1.

In some embodiments, the first end 1*a* of the housing 1 and the second end 1*b* of the housing 1 are spaced at least thirty millimeters away from each other. The first end 1*a* and the second end 1*b* of the housing 1 can be spaced at least sixty millimeters away from each other. The first end 1*a* and the second end 1*b* of the housing 1 can even be spaced at least one hundred millimeters away from each other.

At the first end 1*a* of the housing 1 the housing 1 can be connected to a wall 2 of an exhaust gas stack and/or flue gas stack and/or chimney. The connection between the housing 1 and the wall 2 can for example be made with the aid of a flange 3. In particular the housing 1 can be connected to the wall 2 with the aid of the flange 3.

In some embodiments, the housing 1 can be connected to a side wall 2 of an exhaust gas stack and/or flue gas stack and/or chimney. The connection between the housing 1 and the side wall 2 can for example be made with the aid of a flange 3. In particular the housing 1 can be connected to the side wall 2 with the aid of the flange 3.

The second end 1*b* of the housing 1 is embodied to project into the exhaust gas stack and/or flue gas stack and/or chimney. In one form of embodiment the second end 1*b* of the housing 1 projects into the exhaust gas stack and/or flue gas stack and/or chimney.

In some embodiments, the housing 1 comprises a tubular section between the first end 1*a* and the second end 2. Thus the first end 1*a* of the housing 1 is a first end 1*a* of the tubular section. The second end 1*b* of the housing 1 is a second end 1*b* of the tubular section.

In some embodiments, the first end 1*a* of the tubular section and the second end 1*b* of the tubular section are spaced at least thirty millimeters from one another. The first end 1*a* and the second end 1*b* of the tubular section can be spaced at least sixty millimeters from one another. The first end 1*a* and the second end 1*b* of the tubular section can even be spaced at least one hundred millimeters from one another.

The tubular section can for example have a round cross-sectional shape. The tubular section can for example also have a square and/or rectangular cross-sectional shape.

The tubular section can for example comprise a measuring tip. The tubular section can in particular be a measuring tip. Thus the first end 1*a* of the housing 1 is a first end 1*a* of the measuring tip. The second end 1*b* of the housing 1 is a second end 1*b* of the measuring tip.

In some embodiments, the first end 1*a* of the measuring tip and the second end 1*b* of the measuring tip are spaced at least thirty millimeters from one another. The first end 1*a* and the second end 1*b* of the measuring tip can be spaced at least sixty millimeters from one another. The first end 1*a* and the second end 1*b* of the measuring tip can even be spaced at least one hundred millimeters from one another.

In some embodiments, the measuring tip can for example have a round cross-sectional shape. The measuring tip can for example also have a square and/or rectangular cross-sectional shape.

The housing 1 has a first side, which extends between the first end 1*a* and the second end 1*b* of the housing 1. The first side of the housing 1 can for example involve an upper side of the housing 1. Likewise the first side of the housing 1 can involve a lower side of the housing 1.

In some embodiments, the tubular section can have a first side, which extends between the first end 1*a* and the second end 1*b* of the tubular section. The first side of the tubular section can for example involve an upper side of the tubular section. Likewise the first side of the housing 1 can involve a lower side of the tubular section.

The measuring tip can further have a first side, which extends between the first end 1*a* and the second end 1*b* of the measuring tip. The first side of the measuring tip can for example involve an upper side of the measuring tip. Likewise the first side of the measuring tip can involve a lower side of the measuring tip.

The first side is arranged in such a way that it makes it possible for exhaust gas and/or flue gas to flow in through a plurality of inlet openings 4*a*-4*f*. Accordingly, a direction of flow 5 in the direction of the first side of the housing 1 is indicated in FIG. 1. In some embodiments, a direction of flow 5 in the direction of the first side of the tubular section is indicated in FIG. 1. Ideally is a direction of flow 5 in the direction of the first side of the measuring tip is indicated in FIG. 1. Thus the direction of flow 5 makes possible an inflow through the plurality of inlet openings 4*a*-4*f*. In particular the direction of flow 5 makes it possible for there to be an inflow of exhaust gas and/or flue gas through the plurality of inlet openings 4*a*-4*f*.

The plurality of inlet openings 4*a*-4*f* is arranged along the first side. The arrangement and/or the analysis device can for example comprise two inlet openings along the first side. The arrangement and/or the analysis device can for example also comprise more than two inlet openings along the first side. Thus the arrangement and/or the analysis device can comprise five inlet openings or more than five inlet openings. Furthermore the arrangement and/or the analysis device can comprise ten inlet openings or more than ten inlet openings.

The housing 1 can for example further comprise two inlet openings along the first side. The housing 1 can for example also comprise more than two inlet openings along the first side. Thus the housing 1 can comprise five inlet openings or more than five inlet openings. Furthermore the housing 1 can comprise ten inlet openings or more than ten inlet openings.

The tubular section can for example further comprise two inlet openings along the first side. The tubular section can for example also comprise more than two inlet openings along the first side. Thus the tubular section can comprise five inlet openings or more than five inlet openings. Furthermore the tubular section can comprise ten inlet openings or more than ten inlet openings.

What is more the measuring tip can for example comprise two inlet openings along the first side. The measuring tip can for example also comprise more than two inlet openings along the first side. Thus the measuring tip can comprise five inlet openings or more than five inlet openings. Furthermore the measuring tip can comprise ten inlet openings or more than ten inlet openings.

In some embodiments, the individual inlet openings of the plurality of inlet openings 4*a*-4*f* each comprise an inlet opening for exhaust gas. In some embodiments, the individual inlet openings of the plurality of inlet openings 4*a*-4*f* are each an inlet opening for exhaust gas. In some embodiments, the individual inlet openings of the plurality of inlet openings 4*a*-4*f* each comprise an inlet opening for flue gas. In some embodiments, the individual inlet openings of the plurality of inlet openings 4*a*-4*f* are each an inlet opening for flue gas.

In some embodiments, at least one inlet opening of the plurality of inlet openings 4*a*-4*f* has a round cross-sectional shape. In some embodiments, at least one inlet opening of the plurality of inlet openings 4*a*-4*f* has a square and/or rectangular cross-sectional shape.

In some embodiments, each inlet opening of the plurality of inlet openings 4*a*-4*f* has a round cross-sectional shape. In some embodiments, each inlet opening of the plurality of inlet openings 4*a*-4*f* has a square and/or rectangular cross-sectional shape.

For better mixing, the individual inlet openings of the plurality of inlet openings 4a-4f can have different opening cross-sections. In this way at least one inlet opening can have an opening cross-section that is different from each opening cross-section of the other inlet openings from among the plurality of inlet openings 4a-4f. The opening cross-section of the at least one inlet opening can for example be at least ten percent different from the opening cross-section of the other inlet openings from the plurality of inlet openings 4a-4f. The opening cross-section of the at least one inlet opening can likewise be at least twenty percent different from the opening cross-section of the other inlet openings from the plurality of inlet openings 4a-4f. The opening cross-section of the at least one inlet opening can likewise be at least fifty percent different from the opening cross-section of the other inlet openings from the plurality of inlet openings 4a-4f.

The housing 1 has a second side, which extends between the first end 1a and the second end 1b of the housing 1. The second side of the housing 1 is different from the first side of the housing 1. In other words, the first and the second side do not overlap.

In some embodiments, the second side of the housing 1 lies opposite the first side of the housing 1. The second side of the housing 1 can for example involve a lower side of the housing 1. Likewise the second side of the housing 1 can involve an upper side of the housing 1. In some embodiments, the first side of the housing 1 is arranged parallel to the second side of the housing 1.

In some embodiments, the tubular section can have a second side, which extends between the first end 1a and the second end 1b of the tubular section. The second side of the tubular section is different from the first side of the tubular section. The second side of the tubular section ideally lies opposite the first side of the tubular section. The second side of the tubular section can for example involve a lower side of the tubular section. Likewise, the second side of the tubular section can involve an upper side of the tubular section. In some embodiments, the first side of the tubular section is arranged parallel to the second side of the tubular section.

In some embodiments, the measuring tip can have a second side, which extends between the first end 1a and the second end 1b of the measuring tip. The second side of the measuring tip is different from the first side of the measuring tip. The second side of the measuring tip ideally lies opposite the first side of the measuring tip. The second side of the measuring tip can for example involve a lower side of the measuring tip. Likewise, the second side of the measuring tip can involve an upper side of the measuring tip. In one form of embodiment the first side of the measuring tip is arranged parallel to the second side of the measuring tip.

The second side is arranged, as shown in FIG. 1, in such a way that it makes outflow through at least one outlet opening 6a possible. Accordingly, a direction of flow 7a away from the second side of the housing 1 is indicated in FIG. 1. In some embodiments, a direction of flow 7a away from the second side of the tubular section is indicated in FIG. 1. In some embodiments, a direction of flow 7a away from the second side of the measuring tip is indicated in FIG. 1. Thus the direction of flow 7a makes possible an outflow through the at least one outlet opening 6a. In particular the direction of flow 7a makes possible an outflow of exhaust gas and/or flue gas through the at least one outlet opening 6a.

The placement of the sensor unit 8 and of the outlet opening 6a at the second end 1b has a favorable effect on the flow around the sensor unit 8. Moreover, the placement of the outlet opening 6a at the second end 1b makes possible a little flexibility in the installation of the outlet opening 6a in an exhaust gas stack and/or flue gas stack and/or chimney.

The arrangement and/or the analysis device accordingly comprises at least one outlet opening 6a. The at least one outlet opening 6a is arranged closer to the second end 1b of the housing 1 than to the first end 1a of the housing 1. In other words a first distance $d_1$ exists between the at least one outlet opening 6a and the first end 1a of the housing 1. Moreover a second distance $d_2$ exists between the at least one outlet opening 6a and the second end 1b of the housing 1. In this case the first distance $d_1$ is greater than the second distance $d_2$:

$$d_1 > d_2$$

In some embodiments, the at least one outlet opening 6a is arranged closer to the second end 1b of the tubular section than to the first end 1a of the tubular section. In other words, a first distance $dr_1$ exists between the at least one outlet opening 6a and the first end 1a of the tubular section. Moreover a second distance $dr_2$ exists between the at least one outlet opening 6a and the second end 1b of the tubular section. In this case the first distance $dr_1$ is greater than the second distance $dr_2$:

$$dr_1 > dr_2$$

In some embodiments, the at least one outlet opening 6a is arranged closer to the second end 1b of the measuring tip than to the first end 1a of the measuring tip. In other words a first distance $dm_1$ exists between the at least one outlet opening 6a and the first end 1a of the measuring tip. Moreover a second distance $dm_2$ exists between the at least one outlet opening 6a and the second end 1b of the measuring tip. In this case the first distance $dm_1$ is greater than the second distance $dm_2$:

$$dm_1 > dm_2$$

In some embodiments, the at least one outlet opening 6a has a round cross-sectional shape. In accordance with a further aspect of the present disclosure the at least one outlet opening 6a has a square and/or rectangular cross-sectional shape.

In some embodiments, the at least one outlet opening 6a and each of the inlet openings of the plurality of inlet openings 4a-4f have the same cross-sectional shapes. For example the at least one outlet opening 6a and each of the inlet openings of the plurality of inlet openings 4a-4f can each have a round cross-sectional shape. For example the at least one outlet opening 6a and each of the inlet openings of the plurality of inlet openings 4a-4f can each have a square and/or rectangular cross-sectional shape. The same cross-sectional shapes of the at least one outlet opening 6a and of each of the inlet openings of the plurality of inlet openings 4a-4f reduce the number of tools needed during production.

A sufficiently large opening cross-section of the at least one outlet opening 6a hinders the outflow of the exhaust gas and/or flue gas from the at least one outlet opening 6a as little as possible. The opening cross-section of the at least one outlet opening 6a may be at least as large as the smallest opening cross-section in the plurality of inlet openings 4a-4f. In some embodiments, the opening cross-section of the at least one outlet opening 6a is at least as large as the arithmetic mean of the opening cross-sections from among the plurality of inlet openings 4a-4f. The opening cross-section of the at least one outlet opening 6a may be at least as large as the largest opening cross-section from among the plurality of inlet openings 4a-4f. The opening cross-section of the at least one outlet opening 6a can even be greater than the largest opening cross-section from among the plurality of inlet openings 4a-4f.

The arrangement and/or the analysis device furthermore comprises a sensor unit 8. The sensor unit 8 is arranged in the housing 1. The sensor unit 1 is arranged close to the second end 1b of the housing 1. This means that the sensor unit 8 is arranged closer to the second end 1b of the housing 1 than it is to the first end of the housing 1. In other words, a first distance exists between the sensor unit 8 and the first end 1a of the housing 1. Moreover a second distance exists between the sensor unit 8 and the second end 1b of the housing 1. In this case the first distance is greater than the second distance.

The sensor unit 8 can further be arranged and attached in the tubular section. The sensor unit 8 is arranged close to the second end 1b of the tubular section. This means that the sensor unit 8 is arranged closer to the second end 1b of the tubular section than it is to the first end 1a of the tubular section. In other words a first distance exists between the sensor unit 8 and the first end 1a of the tubular section. Moreover a second distance exists between the sensor unit 8 and the second end 1b of the tubular section. In this case the first distance is greater than the second distance.

What is more the sensor unit 8 can be arranged and attached in the measuring tip. The sensor unit 8 is arranged close to the second end 1b of the measuring tip. This means that the sensor unit 8 is arranged closer to the second end 1b of the measuring tip arranged than it is to the first end 1a of the measuring tip. In other words, a first distance exists between the sensor unit 8 and the first end 1a of the measuring tip. Moreover a second distance exists between the sensor unit 8 and the second end 1b of the measuring tip. In this case the first distance is greater than the second distance.

In some embodiments, the sensor unit 8 is arranged between the plurality of inlet openings 4a-4f and the at least one outlet opening 6a. The arrangement makes possible a flow from the plurality of inlet openings 4a-4f through to the sensor unit 8. The arrangement further makes possible an ongoing flow from the sensor unit 8 to at least one outlet opening 6a. The arrangement in particular makes possible a flow of the exhaust gas and/or flue gas from the plurality of inlet openings 4a-4f through to the sensor unit 8. The arrangement further makes possible an ongoing flow of exhaust gas and/or flue gas from the sensor unit 8 to the at least one outlet opening 6a.

In respect of the averaging of the contributions of the inlet openings from among the plurality of inlet openings 4a-4f the sensor unit 8 is arranged close to the at least one outlet opening 6a. For example a shortest distance between the sensor unit 8 and the outlet opening 6a can amount to less than twenty five millimeters. In particular a shortest distance between the sensor unit 8 and the outlet opening 6a can amount to less than twelve millimeters. A shortest distance between the sensor unit 8 and the outlet opening 6a can even amount to less than six millimeters.

In some embodiments, the sensor unit 8 can comprise a sensor based on zirconium dioxide.

The sensor unit 8 can be connected via a pair of electrical leads 9a, 9b to an evaluation unit. A pair of electrical leads 9a, 9b can extend for example from the sensor unit 8 to the flange 3. The pair of electrical leads 9a, 9b is preferably electrically insulated so that the respective electrical insulations withstand the temperatures in an exhaust gas stack and/or flue gas stack and/or chimney. In particular the pair of electrical leads 9a, 9b can be insulated in such a way that it withstands temperatures of 363 degrees Kelvin. In some embodiments, the pair of electrical leads 9a, 9b can be insulated in such a way that it withstands temperatures of 378 degrees Kelvin. In some embodiments, the pair of electrical leads 9a, 9b can be insulated in such a way that it withstands temperatures of 393 degrees Kelvin. A temperature-resistant electrical insulation leads to a heat-resistant arrangement and/or to a heat-resistant analysis device.

In some embodiments, at least one electrical lead of the pair of electrical leads 9a, 9b simultaneously comprises a mechanical attachment of the sensor unit 8. For example at least one electrical lead of the pair of electrical leads 9a, 9b can simultaneously comprise a mechanical attachment of the sensor unit 8 in relation to the housing 1. At least one electrical lead of the pair of electrical leads 9a, 9b can simultaneously comprise a mechanical attachment of the sensor unit 8 in relation to the tubular section. What is more at least one electrical lead of the pair of electrical leads 9a, 9b can simultaneously comprise a mechanical attachment of the sensor unit 8 in relation to the measuring tip.

In some embodiments, at least one electrical lead of the pair of electrical leads 9a, 9b simultaneously comprises an exclusive mechanical attachment of the sensor unit 8. For example at least one electrical lead of the pair of electrical leads 9a, 9b can simultaneously comprise an exclusive mechanical attachment of the sensor unit 8 in relation to the housing 1. At least one electrical lead of the pair of electrical leads 9a, 9b can simultaneously further comprise an exclusive mechanical attachment of the sensor unit 8 in relation to the tubular section. What is more at least one electrical lead of the pair of electrical leads 9a, 9b can exclusively comprise an exclusive mechanical attachment of the sensor unit 8 in relation to the measuring tip. An exclusive mechanical attachment supports the sensor unit 8 in such a way that no further mechanical attachment is necessary for a stable arrangement of the sensor unit 8.

In that at least one electrical lead of the pair of electrical leads 9a, 9b serves simultaneously as a mechanical attachment, the number of parts needed of the arrangement and/or of analysis device is reduced. As a result of the smaller number of parts needed fewer of these parts can fail or malfunction. Thus the arrangement and/or analysis device is more robust.

Figure 2:
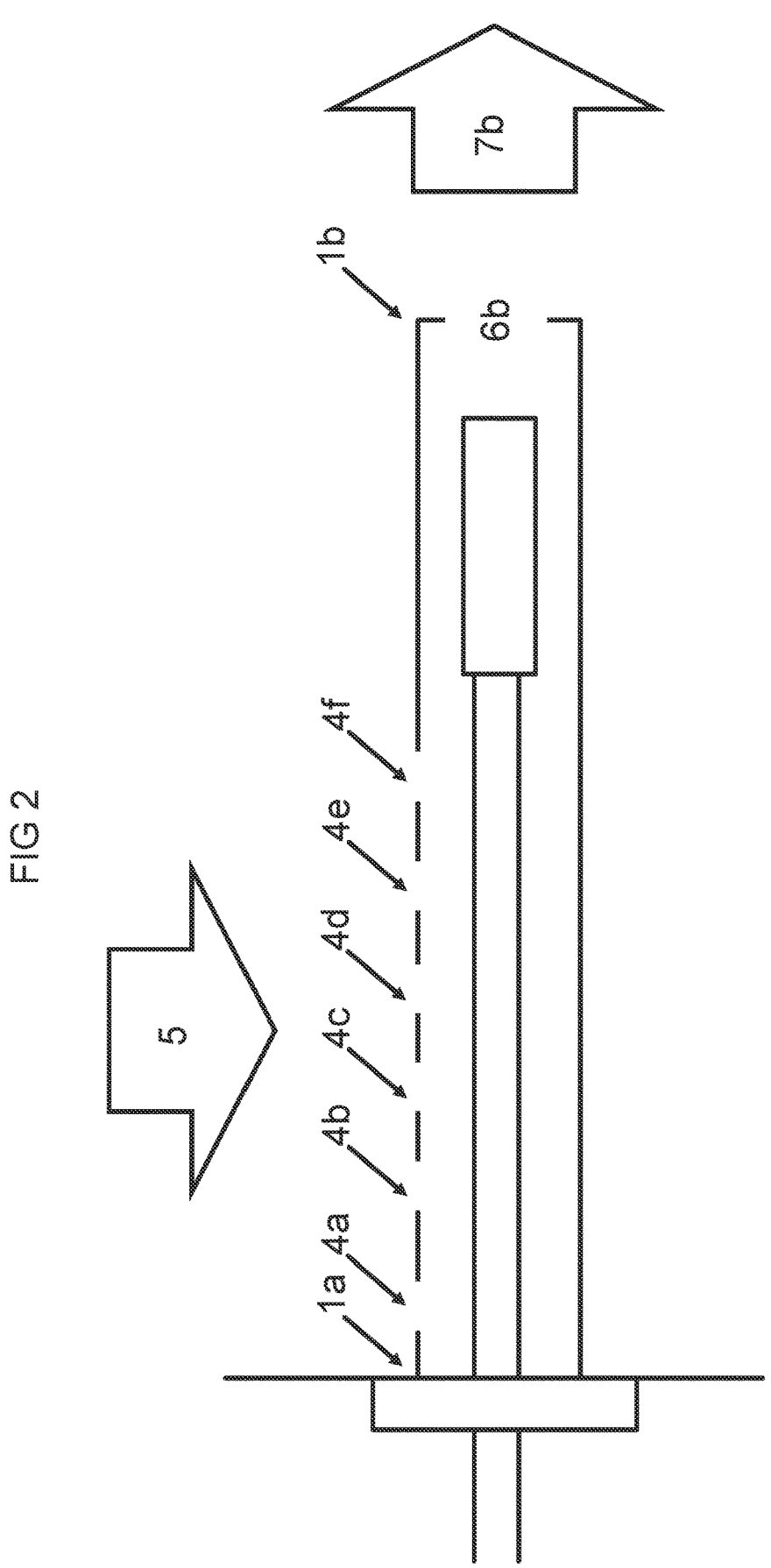
FIG. 2 shows a schematic of an arrangement and/or an analysis device for determination by averaging of a gas concentration with an outlet opening directed to the side.

In accordance with the example shown in FIG. 2 the at least one outlet opening 6b can also not be arranged on either the first or on the second side. In particular the at least one outlet opening 6b directed sideways is not arranged either on the first or on the second side of the housing 1. The at least one outlet opening 6b directed sideways is further not arranged either on the first or on the second side of the of the tubular section. What is more the at least one outlet opening 6b directed sideways is not arranged either on the first or on the second side of the measuring tip.

Instead the at least one outlet opening 6b directed sideways may be arranged laterally on the second end 1b of the housing 1. Thus the housing 1 comprises the at least one outlet opening 6b directed sideways. The at least one outlet opening 6b directed sideways can further be arranged laterally at the second end 1b of the tubular section. Thus the tubular section comprises the at least one outlet opening 6b directed sideways. What is more the at least one outlet opening 6b directed sideways can be arranged laterally at the second end 1b of the measuring tip. Thus the measuring tip comprises the at least one outlet opening 6b directed sideways.

Accordingly a direction of flow 7b directed sideways away from the second end 1b of the housing 1 is indicated in FIG. 2. In some embodiments, a direction of flow 7*b* directed sideways away from the second end 1*b* of the tubular section is indicated in FIG. 1. In some embodiments, a direction of flow 7*b* directed sideways away from the second end 1*b* of the measuring tip is indicated in FIG. 1. Thus the direction of flow 7*b* directed sideways makes possible an outflow through the at least one outlet opening 6*b* directed sideways. In some embodiments, the direction of flow 7*b* directed sideways makes possible an outflow of exhaust gas and/or flue gas through the at least one outlet opening 6*b* directed sideways.

The at least one outlet opening 6*b* directed sideways may be arranged directly at the second end 1*b* of the housing 1. In other words a first distance exists between the at least one outlet opening 6*b* directed sideways and the first end 1*a* of the housing 1. Moreover a second distance exists between the at least one outlet opening 6*b* directed sideways and the second end 1*b* of the housing 1. In this case the first distance is greater than the second distance.

In some embodiments, the at least one outlet opening directed sideways 6*b* is arranged directly at the second end 1*b* of the tubular section. In other words, a first distance exists between the at least one outlet opening 6*b* directed sideways and the first end 1*a* of the tubular section. Moreover a second distance exists between the at least one outlet opening 6*b* directed sideways and the second end 1*b* of the tubular section. In this case the first distance is greater than the second distance.

In some embodiments, the at least one outlet opening 6*b* directed sideways is arranged immediately at the second end 1*b* of the measuring tip. In other words, a first distance exists between the at least one outlet opening 6*b* directed sideways and the first end 1*a* of the measuring tip. Moreover a second distance exists between the at least one outlet opening 6*b* directed sideways and the second end 1*b* of the measuring tip. In this case the first distance is greater than the second distance.

In some embodiments, the at least one outlet opening 6*b* directed sideways has a round cross-sectional shape. In some embodiments, the at least one outlet opening 6*b* directed sideways has a square and/or rectangular cross-sectional shape.

In some embodiments, the at least one outlet opening 6*b* directed sideways and each of the inlet openings of the plurality of inlet openings 4*a*-4*f* have the same cross-sectional shapes. For example the at least one outlet opening 6*b* directed sideways and each of the inlet openings of the plurality of inlet openings 4*a*-4*f* can have a round cross-sectional shape. For example the at least one outlet opening 6*b* directed sideways and each of the inlet openings of the plurality of inlet openings 4*a*-4*f* can have a square and/or rectangular cross-sectional shape. The same cross-sectional shapes of the at least one outlet opening 6*b* and each of the inlet openings of the plurality of inlet openings 4*a*-4*f* reduce the number of tools needed for production.

A sufficiently large opening cross-section of the at least one outlet opening 6*b* directed sideways hinders the outflow of the exhaust gas and/or flue gas out of the at least one outlet opening 6*b* as little as possible. The opening cross-section of the at least one outlet opening 6*b* directed sideways is advantageously at least as large as the smallest opening cross-section from among the plurality of inlet openings 4*a*-4*f*. The opening cross-section of the at least one outlet opening 6*b* directed sideways may be at least as large as the arithmetic mean of the opening cross-sections of the plurality of inlet openings 4*a*-4*f*. The opening cross-section of the at least one outlet opening 6*b* directed sideways is ideally at least as large as the largest opening cross-section from among the plurality of inlet openings 4*a*-4*f*. The opening cross-section of the at least one outlet opening 6*b* directed sideways can even be larger than the largest opening cross-section from among the plurality of inlet openings 4*a*-4*f*.

Figure 3:
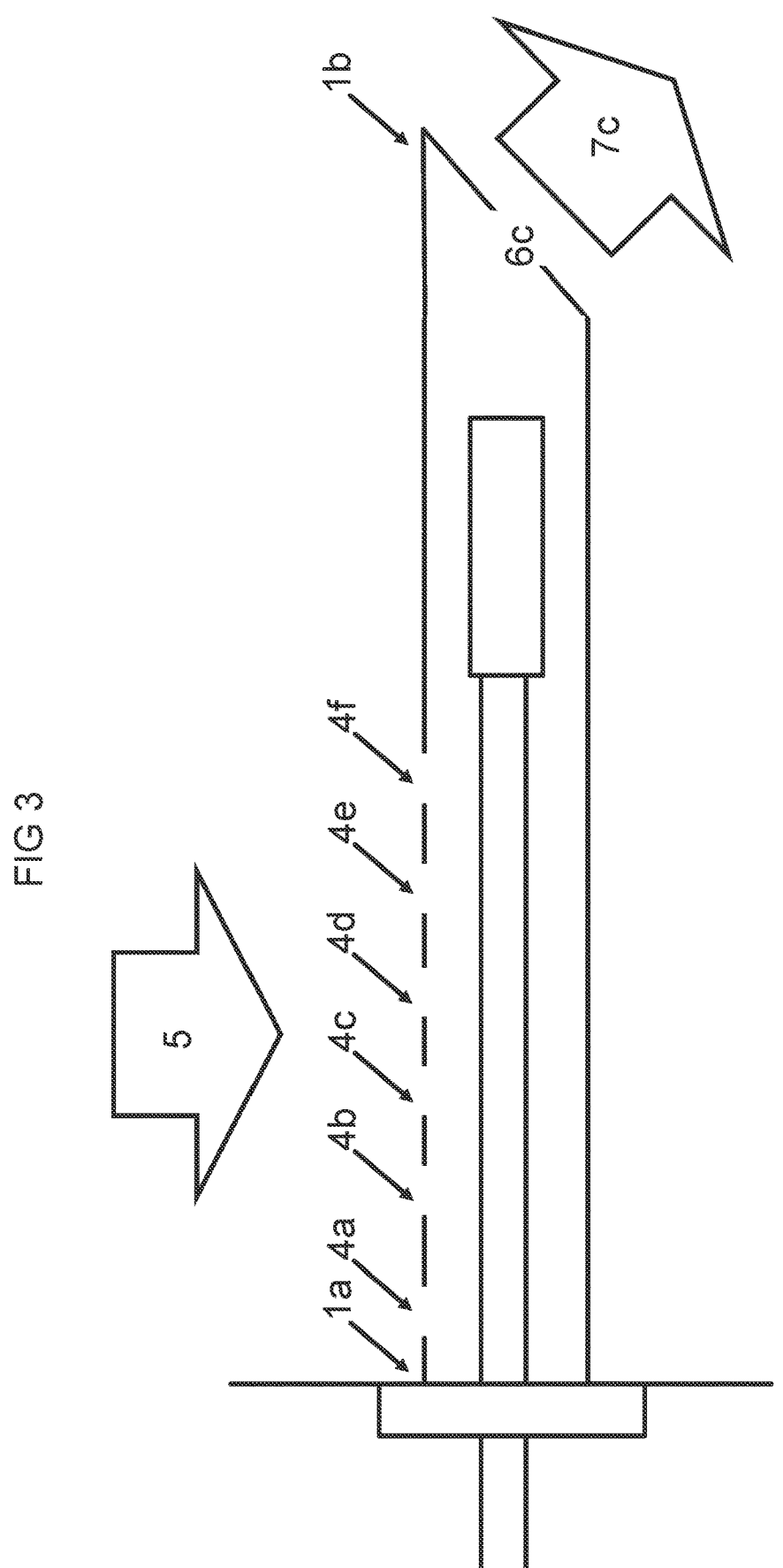
FIG. 3 shows a schematic of an arrangement and/or an analysis device for determination by averaging of a gas concentration with an outlet opening through a slanted end.

In accordance with the example shown in FIG. 3, the at least one outlet opening 6*c* can also not be arranged either on the first or on the second side. In some embodiments, the at least one slanted outlet opening 6*c* is not arranged either on the first or on the second side of the housing 1. Furthermore, the at least one slanted outlet opening 6*c* is not arranged either on the first or on the second side of the tubular section. What is more the at least one slanted outlet opening 6*c* is not arranged either on the first or on the second side of the measuring tip.

Instead the at least one slanted outlet opening 6*c* is arranged on a slanting end 1*b* of the housing 1. Thus the housing 1 comprises the at least one slanted outlet opening 6*c*. In some embodiments, the slanting end 1*b* of the housing 1 comprises the at least one slanted outlet opening 6*c*. The at least one slanted outlet opening 6*c* can further be arranged on a slanting end 1*b* of the tubular section. Thus the tubular section comprises the at least one slanted outlet opening 6*c*. In some embodiments, the slanting end 1*b* of the tubular section comprises the at least one slanted outlet opening 6*c*. What is more the at least one slanted outlet opening 6*c* can be arranged at a slanting end 1*b* of the measuring tip. Thus the measuring tip comprises the at least one slanted outlet opening 6*c*. In some embodiments, the slanting end 1*b* of the measuring tip comprises the at least one slanted outlet opening 6*c*.

Accordingly a direction of flow 7*c* directed at an angle away from the second end 1*b* of the housing 1 is indicated in FIG. 3. In some embodiments, a direction of flow 7*c* directed at an angle away from the second end 1*b* of the tubular section 1 is indicated in in FIG. 1. In some embodiments, a direction of flow 7*c* directed at an angle away from the measuring tip is indicated in FIG. 1. Thus the direction of flow 7*c* directed at an angle makes possible an outflow through the at least one slanted outlet opening 6*c*. In particular the direction of flow 7*c* directed at an angle makes possible an outflow of exhaust gas and/or flue gas through the at least one slanted outlet opening 6*c*.

The at least one slanted outlet opening 6*c* may be arranged at the second end 1*b* of the housing 1. In other words, a first distance exists between the at least one slanted outlet opening 6*c* and the first end 1*a* of the housing 1. Moreover a second distance exists between the at least one slanted outlet opening 6*c* and the second end 1*b* of the housing 1. In this case the first distance is greater than the second distance.

In some embodiments, the at least one slanted outlet opening 6*c* is arranged on the second end 1*b* of the tubular section. In other words, a first distance exists between the at least one slanted outlet opening 6*c* and the first end 1*a* of the tubular section. Moreover a second distance exists between the at least one slanted outlet opening 6*c* and the second end 1*b* of the tubular section. In this case the first distance is greater than the second distance.

In some embodiments, the at least one slanted outlet opening 6*c* is arranged at the second end 1*b* of the measuring tip. In other words a first distance exists between at least one slanted outlet opening 6*c* and the first end 1*a* of the measuring tip. Moreover a second distance exists between the at least one slanted outlet opening 6*c* and the second end 1*b* of the measuring tip. In this case the first distance is greater than the second distance.

In some embodiments, the at least one slanted outlet opening 6c has a round cross-sectional shape. In some embodiments, the at least one slanted outlet opening 6c has a square and/or rectangular cross-sectional shape.

In some embodiments, the at least one slanted outlet opening 6c and each of the inlet openings of the plurality of inlet openings 4a-4f have the same cross-sectional shapes. For example, the at least one slanted outlet opening 6c and each of the inlet openings of the plurality of inlet openings 4a-4f each have a round cross-sectional shape. For example, the at least one slanted outlet opening 6c and each of the inlet openings of the plurality of inlet openings 4a-4f can each have a square and/or rectangular cross-sectional shape. The same cross-sectional shapes of the at least one slanted outlet opening 6c and each of the inlet openings of the plurality of inlet openings 4a-4f reduce the number of tools needed during production.

A sufficiently large opening cross-section of the at least one slanted outlet opening 6c hinders the flow of the exhaust gas and/or flue gas out of the at least one slanted outlet opening 6c as little as possible. The opening cross-section of the at least one slanted outlet opening 6c may be at least as large as the smallest opening cross-section from among the plurality of inlet openings 4a-4f. The opening cross-section of the at least one slanted outlet opening 6c may be at least as large as the arithmetic mean of the opening cross-sections of the plurality of inlet openings 4a-4f. The opening cross-section of the at least one slanted outlet opening 6c may be at least as large as the largest opening cross-section from among the plurality of inlet openings 4a-4f. The opening cross-section of the at least one slanted outlet opening 6c can even be larger than the largest opening cross-section from among the plurality of inlet openings 4a-4f.

Some embodiments of the teachings herein include an arrangement comprising a sensor unit (8) and a housing (1) with a first end (1a) and a second end (1b), with a plurality of inlet openings (4a-4f) and with at least one outlet opening (6a-6c);

wherein the arrangement at the first end (1a) of the housing (1) comprises an attachment apparatus (3) for mechanical attachment of the housing (1) to a wall (2), so that the housing (1) is essentially immovable in relation to the wall (2);

wherein the first end (1a) is different from the second end (1b) and the at least one outlet opening (6a-6c) is from each inlet opening of the plurality of inlet openings (4a-4f);

wherein the sensor unit (8) is arranged inside the housing (1) and is at a first distance from the first end (1a) and at a second distance from the second end;

wherein the first distance between the sensor unit (8) and the first end (1a) is greater than the second distance between the sensor unit (8) and the second end (1b);

wherein the at least one outlet opening (6a-6c) is at a first distance from the first end (1a) and at a second distance from the second end (1b) and wherein the first distance between the at least one outlet opening (6a-6c) and the first end (1a) is greater than the second distance between the at least one outlet opening (6a-6c) and the second end (1b).

In some embodiments, the arrangement at the first end (1a) of the housing (1) comprises the attachment apparatus (3) for mechanical attachment of the housing (1) to a wall (2), so that the housing (1) is immovable in relation to the wall (2).

In some embodiments, the second end (1b) of the housing (1) is a free end of the housing (1). In particular the second end (1b) of the housing (1) is not embodied for attachment to a wall (2). The second end (1b) of the housing (1) advantageously points into an exhaust gas stack and/or flue gas stack and/or chimney or is embodied to do so.

In some embodiments, at least one inlet opening of the plurality of inlet openings (4a-4f) is embodied as an inlet opening for exhaust gas and/or flue gas in the housing (1). In some embodiments, each inlet opening of the plurality of inlet openings (4a-4f) is embodied as an inlet opening for exhaust gas and/or flue gas in the housing (1).

In some embodiments, the at least one outlet opening (6a-6c) is embodied as an outlet opening for exhaust gas and/or flue gas from the housing (1).

The present disclosure also teaches one of the aforementioned arrangements, wherein sensor unit (8) is in fluid communication with each inlet opening of the plurality of inlet openings (4a-4f) and to the at least one outlet opening (6a-6c).

In some embodiments, the arrangement comprises an analysis device. In some embodiments, the arrangement is an analysis device.

In some embodiments, the arrangement comprises an arrangement for analysis of exhaust gases and/or flue gases. In some embodiments, the arrangement is an arrangement for analysis of exhaust gases and/or flue gases.

In some embodiments, the arrangement comprises an analysis device for analysis of exhaust gases and/or flue gases. In some embodiments, the arrangement is an analysis device for analysis of exhaust gases and/or flue gases.

The present disclosure further teaches one of the aforementioned arrangements, wherein the attachment apparatus (3) is at a first distance from the first end (1a) and at a second distance from the second end; and wherein the first distance between the attachment apparatus (3) and the first end (1a) is less than the second distance between the attachment apparatus (3) and the second end (1b).

The present disclosure likewise teaches one of the aforementioned arrangements, wherein the attachment apparatus (3) comprises a flange.

The present disclosure furthermore teaches one of the aforementioned arrangements, wherein the attachment apparatus (3) is a flange. The present disclosure moreover teaches one of the aforementioned arrangements, wherein the attachment apparatus (3) comprises a screw attachment. What is more the present disclosure teaches one of the aforementioned arrangements, wherein the attachment apparatus (3) is a screw connection. The present disclosure further teaches one of the aforementioned arrangements, wherein the attachment apparatus (3) comprises a plug-in connection. The present disclosure also teaches one of the aforementioned arrangements, wherein the attachment apparatus (3) is a plug-in connection.

The present disclosure moreover teaches one of the aforementioned arrangements, wherein the arrangement comprises a pair of electrical leads; and wherein at least one electrical lead of the pair of electrical leads (9a, 9b) extends from the sensor unit (8) to the attachment apparatus (3).

The present disclosure furthermore teaches one of the aforementioned arrangements, wherein the arrangement comprises a pair of electrical leads; and wherein each electrical lead of the pair of electrical leads (9a, 9b) extends from the sensor unit (8) to the attachment apparatus (3).

In some embodiments, the pair of electrical leads (9a, 9b) runs within the housing (1).

The present disclosure likewise teaches one of the aforementioned arrangements comprising a pair of electrical leads (9a, 9b), wherein at least one electrical lead of the pair of electrical leads (9a, 9b) mechanically supports the sensor unit (8) in relation to the housing (1).

The present disclosure furthermore teaches one of the aforementioned arrangements comprising a pair of electrical leads (9a, 9b), wherein the attachment apparatus (3) is attached mechanically to the housing (1); and wherein at least one electrical lead of the pair of electrical leads (9a, 9b) is mechanically mounted to the attachment apparatus (3), so that the at least one electrical lead of the pair of electrical leads (9a, 9b) mechanically supports the sensor unit (8) in relation to the housing (1).

The present disclosure moreover teaches one of the aforementioned arrangements comprising a pair of electrical leads (9a, 9b), wherein the attachment apparatus (3) is mechanically attached to the housing (1); and wherein exclusively one electrical lead of the pair of electrical leads (9a, 9b) is mechanically mounted to the attachment apparatus (3), so that the exclusively one electrical lead of the pair of electrical leads (9a, 9b) fixed to the attachment apparatus (3) mechanically supports the sensor unit (8) in relation to the housing (1).

What is more the present disclosure teaches one of the aforementioned arrangements comprising a pair of electrical leads (9a, 9b), wherein at least one further electrical lead of the pair of electrical leads (9a, 9b) is directly mechanically attached to the housing (1), so that the at least one further electrical lead of the pair of electrical leads (9a, 9b) mechanically supports the sensor unit (8) in relation to the housing (1).

The present disclosure furthermore teaches one of the aforementioned arrangements comprising a pair of electrical leads (9a, 9b), wherein exclusively one further electrical lead of the pair of electrical leads (9a, 9b) is directly mechanically attached to the housing (1), so that the exclusively one further electrical lead of the pair of electrical leads (9a, 9b) mechanically supports the sensor unit (8) in relation to the housing (1).

The present disclosure further teaches one of the aforementioned arrangements comprising a pair of electrical leads (9a, 9b), wherein the arrangement comprises an evaluation unit; and wherein at least one electrical lead of the pair of electrical leads (9a, 9b) electrically connects the sensor unit (8) to the evaluation unit.

The present disclosure furthermore teaches one of the aforementioned arrangements comprising a pair of electrical leads (9a, 9b), wherein the arrangement comprises an evaluation unit; and wherein at least one electrical lead of the pair of electrical leads (9a, 9b) galvanically connects the sensor unit (8) to the evaluation unit.

The present disclosure moreover teaches one of the aforementioned arrangements, wherein the arrangement comprises precisely one outlet opening (6a-6c).

The present disclosure what is more teaches one of the aforementioned arrangements, wherein the housing (1) comprises a first side, which extends from the first end (1a) of the housing (1) to the second end (1b) of the housing (1);

wherein the housing (1) comprises a second side, which extends from the first end (1a) of the housing (1) to the second end (1b) of the housing (1);

wherein the second side is different from the first side;

wherein at least one inlet opening of the plurality of inlet openings (4a-4f) is arranged on the first side; and wherein the at least one outlet opening (6a) is arranged on the second side.

The present disclosure also teaches one of the aforementioned arrangements comprising a first side, wherein each inlet opening of the plurality of inlet openings (4a-4f) is arranged on the first side.

The present disclosure further teaches one of the aforementioned arrangements comprising a first and a second side, wherein the second side runs parallel to the first side.

The present disclosure moreover teaches one of the aforementioned arrangements, wherein the at least one outlet opening (6b) is arranged directly on the second end (1b).

The present disclosure also teaches one of the aforementioned arrangements comprising a tubular section, wherein the housing (1) comprises a first side, which extends from the first end (1a) of the housing (1) to the second end (1b) of the housing (1);

wherein the housing (1) comprises a second side, which extends from the first end (1a) of the housing (1) to the second end (1b) of the housing (1);

wherein the second side is different from the first side;

wherein at least one inlet opening of the plurality of inlet openings (4a-4f) is arranged on the first side; and wherein the at least one outlet opening (6b) is arranged outside the first side and outside the second side.

The present disclosure further teaches one of the aforementioned arrangements comprising a tubular section, wherein the housing (1) comprises a tubular section at its second end (1b); and wherein the at least one outlet opening (6b) comprises an open end of the tubular section.

The present disclosure moreover teaches one of the aforementioned arrangements comprising a tubular section, wherein the at least one outlet opening (6b) is an open end of the tubular section.

The present disclosure furthermore teaches one of the aforementioned arrangements comprising a tubular section, wherein the at least one outlet opening (6b) comprises a completely open end of the tubular section.

The present disclosure moreover teaches one of the aforementioned arrangements comprising a tubular section, wherein the at least one outlet opening (6b) is a completely open end of the tubular section.

The present disclosure further teaches one of the aforementioned arrangements comprising a first and a second side and a tubular section, wherein the second side runs parallel to the first side.

The present disclosure further teaches one of the afore-mentioned arrangements, wherein the housing (1) comprises a slanted section at its second end (1b); and wherein the at least one outlet opening (6c) is part of the slanted section.

The present disclosure moreover teaches one of the afore-mentioned arrangements comprising a slanted section, wherein the housing (1) comprises a first side, which extends from the first end (1a) of the housing (1) to the second end (1b) of the housing (1);

wherein at least one inlet opening of the plurality of inlet openings (4a-4f) is arranged on the first side;

wherein the housing (1) comprises a slanted section, which runs at an angle to the first side on its second end (1b); and wherein the at least one outlet opening (6c) is part of the slanted section.

In some embodiments, the slanted section runs at an acute angle to the first side. In accordance with another form of embodiment the slanted section runs at an oblique angle to the first side.

The present disclosure furthermore teaches one of the aforementioned arrangements comprising a slanted section, wherein the housing (1) comprises a first side, which extends from the first end (1a) of the housing (1) to the second end (1b) of the housing (1);

wherein the housing (1) comprises a second side, which extends from the first end (1a) of the housing (1) to the second end (1b) of the housing (1);

wherein the second side is different from the first side;

wherein at least one inlet opening of the plurality of inlet openings (4a-4f) is arranged on the first side;

wherein the housing (1) comprises a slanted section, which runs at an angle to the first side and to the second side at its second end (1b); and wherein the at least one outlet opening (6c) is part of the slanted section.

In some embodiments, the slanted section runs at an acute angle to the first side and to the second side. In accordance with another form of embodiment the slanted section runs at an oblique angle to the first side and to the second side.

The present disclosure further teaches one of the afore-mentioned arrangements comprising a first and a second side and a slanted section, wherein the second side runs parallel to the first side.

The present disclosure likewise teaches a combustion apparatus comprising a combustion chamber and an exhaust gas stack and/or flue gas stack and/or chimney, wherein the exhaust gas stack and/or flue gas stack and/or chimney connection is in fluid communication with the combustion chamber;

wherein the exhaust gas stack and/or flue gas stack and/or chimney comprises a wall (2); and wherein the attachment apparatus (3) of an arrangement as claimed in one of claims 1 to 14 is mechanically attached to the wall (2).

The present disclosure further teaches a combustion appa-ratus comprising a combustion chamber and one of the aforementioned attachment apparatuses (3) and an exhaust gas duct selected from an exhaust gas stack, a flue gas stack, a chimney, wherein the exhaust gas duct connection is in fluid communication with the combustion chamber;

wherein the exhaust gas duct comprises a wall (2); and wherein the attachment apparatus (3) is mechanically mounted to the wall (2).

In some embodiments, the wall (2) comprises an inner wall and/or a side wall. Ideally the wall (2) is an inner wall and/or a side wall.

In some embodiments, the combustion chamber of the combustion apparatus connection is in fluid communication with the sensor unit (8) via the exhaust gas stack and/or flue gas stack and/or chimney and via at least one inlet opening of the plurality of inlet openings (4a-4f).

The above text relates to individual forms of embodiment of the disclosure. Various changes to the forms of embodi-ment can be made without deviating from the underlying idea and without departing from the framework of this disclosure. The subject matter of the present disclosure is defined by its claims. Various changes can be made without departing from the scope of protection of the claims given below.

LIST OF REFERENCE CHARACTERS

1: Housing
1a, 1b: First and second end
2: Wall
3: Flange
4a-4f: Inlet openings
5: Direction of flow
6a-6c: Outlet openings
7a-7c: Directions of flow
8: Sensor unit
9a, 9b: Electrical leads

The invention claimed is:

1. An arrangement comprising:

a sensor unit;

a housing with a first end, a second end, a plurality of inlet openings, and an outlet opening;

a pair of electrical leads; and an attachment apparatus for a fixed mechanical attach-ment of the housing to a wall at the first end of the housing;

wherein at least one electrical lead of the pair of electrical leads extends from the sensor unit to the attachment apparatus;

the outlet opening is not one of the plurality of inlet openings;

the sensor unit is arranged at least partially inside the housing at a first distance from the first end and at a second distance from the second end;

the first distance is greater than the second distance;

the outlet opening is at a third distance from the first end and a fourth distance from the second end; and the third distance is greater than the fourth distance.

2. The arrangement as claimed in claim 1, wherein:

the attachment apparatus is at a fifth distance from the first end and at a sixth distance from the second end; and the fifth distance is less than the sixth distance.

3. The arrangement as claimed in claim 1, wherein the attachment apparatus comprises a flange.

4. The arrangement as claimed in claim 1, wherein at least one electrical lead of the pair of electrical leads mechani-cally supports the sensor unit in relation to the housing.

5. The arrangement as claimed in claim 1, further com-prising an evaluation unit;

wherein at least one electrical lead of the pair of electrical leads electrically connects the sensor unit to the evalu-ation unit.

6. The arrangement as claimed in claim 1, wherein the arrangement comprises precisely one outlet opening.

7. The arrangement as claimed in claim 1, wherein:

the housing comprises a first side extending from the first end of the housing to the second end of the housing;

the housing comprises a second side extending from the first end of the housing to the second end of the housing;

the second side is different from the first side;

at least one inlet opening of the plurality of inlet openings is arranged on the first side; and the outlet opening is arranged on the second side.

8. The arrangement as claimed in claim 7, wherein each inlet opening of the plurality of inlet openings is arranged on the first side.

9. The arrangement as claimed in claim 1, wherein:

the housing comprises a slanted section at its second end; and the outlet opening is part of the slanted section.

10. The arrangement as claimed in claim 9, wherein:

the housing comprises a first side extending from the first end of the housing to the second end of the housing;

at least one inlet opening of the plurality of inlet openings is arranged on the first side;

the housing comprises a slanted section running at an angle to the first side, at its second end; and the outlet opening is part of the slanted section.

11. The arrangement as claimed in claim 1, wherein the outlet opening is arranged directly at the second end.

12. The arrangement as claimed in claim 11, wherein:

the housing comprises a first side extending from the first end of the housing to the second end of the housing;

the housing comprises a second side extending from the first end of the housing to the second end of the housing;

the second side is different from the first side; and at least one inlet opening of the plurality of inlet openings is arranged on the first side.

13. The arrangement as claimed in claim 11, wherein:

the housing comprises a tubular section at its second end; and the outlet opening comprises an open end of the tubular section.

14. A combustion apparatus comprising:

a combustion chamber; and an exhaust in fluid communication with the combustion chamber, wherein the exhaust comprises a wall and a gas stack and/or flue gas stack and/or chimney;

a sensor unit;

a housing with a first end, a second end, a plurality of inlet openings, and an outlet opening;

a pair of electrical leads; and an attachment apparatus for a fixed mechanical attachment of the housing to the wall of the exhaust;

wherein at least one electrical lead of the pair of electrical leads extends from the sensor unit to the attachment apparatus;

the outlet opening is not one of the plurality of inlet openings;

the sensor unit is arranged at least partially inside the housing at a first distance from the first end and at a second distance from the second end;

the first distance is greater than the second distance;

the outlet opening is at a third distance from the first end and a fourth distance from the second end;

the third distance is greater than the fourth distance; and the attachment apparatus is mechanically mounted to the wall.

\*   \*   \*   \*   \*